(12) United States Patent
Li

(10) Patent No.: US 9,356,285 B2
(45) Date of Patent: *May 31, 2016

(54) POSITIVE ELECTRODE MATERIAL AND POSITIVE ELECTRODE FOR NICKEL—ZINC SECONDARY BATTERY AND METHOD FOR MANUFACTURING POSITIVE ELECTRODE

(75) Inventor: Ruiling Li, Guangdong (CN)

(73) Assignee: GUANGDONG POWERLINK ENERGY CO., LTD, Guangdong (CN)

( * ) Notice: Subject to any disclaimer, the term of this patent is extended or adjusted under 35 U.S.C. 154(b) by 98 days.

This patent is subject to a terminal disclaimer.

(21) Appl. No.: 13/994,648

(22) PCT Filed: Jun. 15, 2012

(86) PCT No.: PCT/CN2012/076970
§ 371 (c)(1),
(2), (4) Date: Jun. 14, 2013

(87) PCT Pub. No.: WO2012/175000
PCT Pub. Date: Dec. 27, 2012

(65) Prior Publication Data
US 2013/0266863 A1 Oct. 10, 2013

(30) Foreign Application Priority Data
Jun. 22, 2011 (CN) .......................... 2011 1 0169868

(51) Int. Cl.
*H01M 4/36* (2006.01)
*H01M 4/26* (2006.01)
(Continued)

(52) U.S. Cl.
CPC .............. *H01M 4/366* (2013.01); *H01M 4/26* (2013.01); *H01M 4/32* (2013.01); *H01M 4/48* (2013.01);
(Continued)

(58) Field of Classification Search
CPC ....................................................... H01M 4/36
USPC .............................. 429/231.95, 212, 223, 231
See application file for complete search history.

(56) References Cited

U.S. PATENT DOCUMENTS 5,451,475 A * 9/1995 Ohta et al. ..................... 429/212
5,989,746 A * 11/1999 Bernard .................. H01M 4/32
429/223

(Continued)

FOREIGN PATENT DOCUMENTS

CN 1503994 A 6/2004
CN 101165959 4/2008
(Continued)

OTHER PUBLICATIONS

Chinese Office Action dated Feb. 16, 2013, Chinese Patent Application No. CN201110169868.0.
(Continued)

*Primary Examiner* — Patrick Ryan
*Assistant Examiner* — Alex Usyatinsky
(74) *Attorney, Agent, or Firm* — Vierra Magen Marcus LLP

(57) ABSTRACT

The present invention provides a positive electrode material for a nickel-zinc secondary battery, a positive electrode for a nickel-zinc secondary battery and a method for preparing the positive electrode. The positive electrode material for a nickel-zinc secondary battery provided by the present invention includes: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; the positive electrode active material being a spherical nickel hydroxide coated with Co (III). The positive electrode material for a nickel-zinc secondary battery provided by the present invention contains no Co(II) ion and cadmium ion. The positive electrode prepared by the positive electrode material provided by the present invention can reduce the amount of hydrogen evolved in the battery while ensuring relatively high electrode charging/discharging capacity.

9 Claims, 1 Drawing Sheet

(51) Int. Cl.
  *H01M 4/32* (2006.01)
  *H01M 4/62* (2006.01)
  *H01M 4/66* (2006.01)
  *H01M 4/48* (2010.01)
  *H01M 10/30* (2006.01)

(52) U.S. Cl.
  CPC .............. *H01M 4/622* (2013.01); *H01M 4/624* (2013.01); *H01M 4/661* (2013.01); *H01M 10/30* (2013.01); *Y02E 60/124* (2013.01)

(56) References Cited

U.S. PATENT DOCUMENTS

| | | | |
|---|---|---|---|
| 7,488,557 B2* | 2/2009 | Maeda et al. | 429/217 |
| 2009/0208839 A1* | 8/2009 | Geng et al. | 429/206 |
| 2010/0062339 A1* | 3/2010 | Pan et al. | 429/231.95 |

FOREIGN PATENT DOCUMENTS

| | | |
|---|---|---|
| CN | 101188309 | 5/2008 |
| CN | 101593834 | 12/2009 |
| CN | 102263266 | 11/2011 |

OTHER PUBLICATIONS

PCT International Search Report dated Jul. 17, 2012, PCT Patent Application No. PCT/CN2012/076970.

PCT Written Opinion of the International Searching Authority dated Jul. 17, 2012, PCT Patent Application No. PCT/CN2012/076970.

English Translation of Abstract of Chinese Patent Application No. CN1503994A.

English Translation of Abstract of Chinese Patent Application No. CN101593834.

English Translation of Abstract of Chinese Patent Application No. CN102263266.

English Translation of Abstract of Chinese Patent Application No. CN101165959.

English Translation of Abstract of Chinese Patent Application No. CN101188309.

* cited by examiner

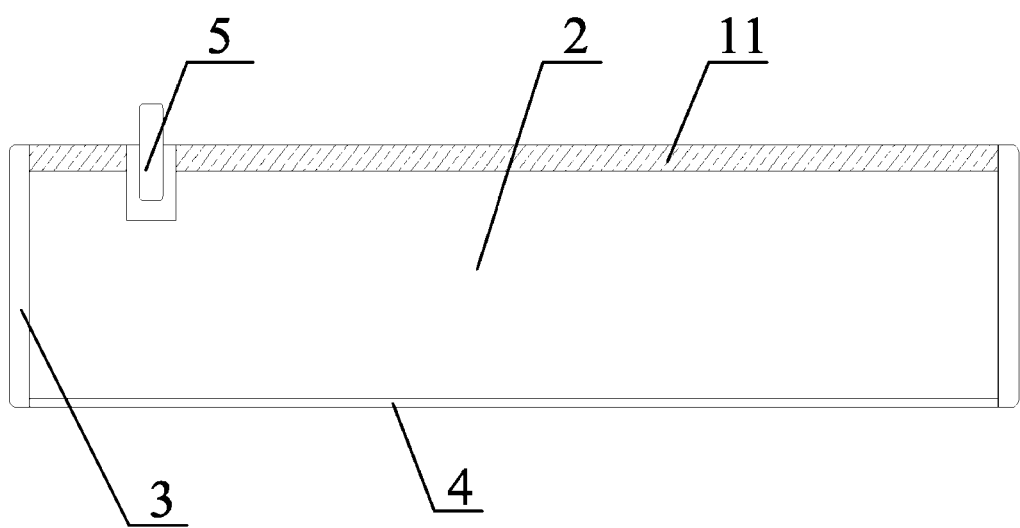

POSITIVE ELECTRODE MATERIAL AND POSITIVE ELECTRODE FOR NICKEL—ZINC SECONDARY BATTERY AND METHOD FOR MANUFACTURING POSITIVE ELECTRODE

FIELD OF THE INVENTION

The present invention relates to the field of nickel-zinc batteries, and, in particular, relates to positive electrode material and positive electrode for nickel-zinc secondary batteries, and method for manufacturing the positive electrode.

BACKGROUND OF THE INVENTION

A chemical battery refers to a device for transforming chemical energy to electrical energy, which is becoming a necessity for daily life and work. At present, the commercially available batteries mainly include lead acid battery, nickel-cadmium battery, nickel-hydrogen battery, and lithium ion battery. The lead acid battery and the nickel-cadmium battery are restricted for use in various countries in the world due to the disadvantages of low specific energy, containing toxic metals, and serious environmental pollution. The nickel-hydrogen battery is only suitable for using as the power source of small size devices due to low operating voltage and large self-discharge at high temperature. The lithium ion battery has succeed in portable electronic devices, but the problems regarding insufficient power, high price and safety risk prevent it from meeting the demands for large scale systems.

A nickel-zinc secondary battery is comprised of a zinc electrode and a nickel electrode, and combines the advantages of high negative electrode capacity in zinc-silver battery and long service life of positive electrode in nickel-cadmium battery. A nickel-zinc battery has a relatively high specific energy of actually 115 Wh/kg or higher; a specific power of more than 200 W/kg; a wide operating range, that is, a working temperature range of −20° C.~60° C.; and the advantages of high operating voltage, stable discharge, supporting high current discharge, low cost, and free of pollution. Having these advantages, a nickel-zinc secondary battery is suitable for using as the power source of portable electronic products such as portable computer, digital camera, and the like, and is expected to become the power battery for electric automobiles, replacing conventional power batteries.

A nickel-zinc secondary battery includes a battery case, an electrode assembly, and an electrolyte, in which the electrode assembly and the electrode are accommodated in the battery case. The electrode assembly comprises a nickel positive electrode, a zinc negative electrode, and a membrane separator disposed between the nickel positive electrode and the zinc negative electrode. The currently existed nickel-zinc secondary often adopts the nickel positive electrode used in a nickel-hydrogen battery or a nickel-cadmium battery, which is a flexible foil electrode formed by generally using a substrate of a nickel foil or foamed nickel, and coating the surface or inside of the substrate with active material for positive electrode, that is, $Ni(OH)_2$.

During the preparing and charging/discharging process of $Ni(OH)_2$, there are always some unreduced Ni (III) ions, which are referred as electron defects in the field of semiconductor, and some stoichiometrically excessive $O^{2-}$ ions, which are referred as proton defects. Therefore, in the lattice of $Ni(OH)_2$ some amount of $OH^-$ ions are replaced by $O^{2-}$ ions. The conductivity of this kind of semiconductor depends not only on the motility of the electron defects and the concentration of the electron defects in the lattice, but also on the above defects existed in the lattice. These reasons lead to poor conductivity of nickel hydroxide, as well as the phenomenon that oxygen is evolved soon after charging, penetrated the membrane separator, and adsorbed on the negative electrode. Therefore, $Co^{2+}$ is often added to current nickel electrode to improve the conductivity of the nickel electrode, so that the reaction product $Co^{3+}$ can form an excellent conductive net among the particles of nickel hydroxide with the proceeding of charge, so as to improve the "overpotential for oxygen evolution" of the nickel electrode, reduce the resistance of the battery, delay the evolution of oxygen, and enhance charging efficiency. Similarly, it facilitates improving the discharging depth of the nickel electrode during discharging, thereby improving the discharging capacity of the battery. Additionally, it is often necessary to add $Cd^{2+}$ to $Ni(OH)_2$, so as to improve the electrolytically charging overpotential of the battery.

However, if the above nickel electrode components are used in a nickel-zinc electrode, $Co^{2+}$, which is easily dissolved in the electrolyte KOH solution, will diffuse toward the negative electrode, and is rapidly reduced on the zinc electrode. Due to low potential for hydrogen evolution of Co, the precipitated Co on the negative electrode will consist a hydrogen-evolving corrosive primary battery together with the electrolyte and the zinc on the negative electrode, causing the continuous evolution of hydrogen and the soaring of the pressure in the battery, and increasing the possibility of explosion and liquid leakage in the battery, leading to large safety risk. At the same time, with the continuous consumption of the negative electrode and the fading of the capacity, the charge retention property becomes poorer. Additionally, the Cd added will cause pollution to the surrounding environment and the human body, decreasing the environmental friendliness of the battery.

SUMMARY OF THE INVENTION

The technical problem to be solved by the present invention is to provide a positive electrode material for nickel-zinc secondary electrode, a positive electrode for nickel-zinc secondary battery, and a method for preparing the positive electrode for nickel-zinc secondary battery. The positive electrode prepared from the positive electrode material provided by the present invention can reduce the amount of hydrogen evolved in the battery while ensuring relatively high electrode charging/discharging capacity.

Correspondingly, the present invention provides a positive electrode material for a nickel-zinc secondary battery, which includes:

68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; the positive electrode active material being a spherical nickel hydroxide coated with $Co^{3+}$.

Preferably, the yttrium oxide has a particle diameter of 90 to 120 mesh, the calcium hydroxide has a particle diameter of 70 to 90 mesh, and the nickel powder has a particle diameter of 50 to 70 mesh.

Preferably, the binder is the mixture of polytetrafluoroethylene emulsion and carboxymethyl cellulose solution, or the mixture of polytetrafluoroethylene emulsion and hydroxypropyl methyl cellulose solution.

The present invention further provides a positive electrode for a nickel-zinc secondary battery, the positive electrode comprising a base tape and a positive electrode material coated on the surface of the base tape, in which the positive electrode material includes: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; the positive electrode active material being a spherical nickel hydroxide coated with $Co^{3+}$.

Preferably, the coiling head end and the coiling tail end of the base tape are coated with an air permeable membrane.

Preferably, the positive electrode further includes: a positioning adhesive layer coated on the lower surface of the base tape and positioned on one side of the positive electrode material, the positioning adhesive layer being formed by drying an adhesive, which is the mixture of polytetrafluoroethylene emulsion and hydroxypropyl methyl cellulose solution.

Preferably, the positioning adhesive layer has a width of 1.5 mm~2.5 mm

Preferably, the positive electrode further includes a conductive, shockproof nickel metal sheet welded on the surface of the base tape.

Preferably, the base tape is a continuous porous nickel base tape having an areal density of 300~520 $g/cm^2$.

The present invention also provide a method for preparing the above positive electrode for the nickel-zinc secondary battery, comprising:

a) coating the base tape with the positive material comprising 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; the positive electrode active material being a spherical nickel hydroxide coated with $Co^{3+}$; and b) sequentially subjecting the base tape obtained in step a) to drying, rolling, and cutting to provide the positive electrode for the nickel-zinc secondary battery.

The present invention provides a positive electrode material for a nickel-zinc secondary battery, the positive electrode material including: 68 wt %~69 wt % positive electrode active material, 0.6 wt %~1 wt % yttrium oxide, 0.2 wt %~0.6 wt % calcium hydroxide, 3.5 wt %~4 wt % nickel powder and a binder in balance; the positive electrode active material being a spherical nickel hydroxide coated with $Co^{3+}$. In comparison with the currently existing positive electrode material for a nickel-zinc secondary battery, the positive electrode material provided by the present invention contains neither $Co^{2+}$ ion nor Cd ion, thereby reducing the amount of hydrogen evolved from the electrode and improving the environmental friendliness of the battery. Spherical nickel hydroxide coated with $Co^{3+}$ is used as the positive electrode active material to improve the charging/discharging efficiency of the electrode, and nickel powder, yttrium oxide, and calcium hydroxide are collectively used as the positive electrode additive. The nickel powder is used to improve the discharging depth of the nickel electrode, catalyze the compounding of hydrogen and oxygen, and decrease the amount of hydrogen evolved; and the yttrium oxide and the calcium hydroxide are used to further improve the oxygen overpotential and the discharging depth of the electrode. Therefore, the positive electrode prepared from the positive electrode material provided by the invention can reduce the amount of hydrogen evolved in the battery while ensuring relatively high electrode charging/discharging capacity, thereby improving the service life and safety of the nickel-zinc electrode.

BRIEF DESCRIPTION OF THE DRAWINGS

FIG. 1 is a schematically structural view of a preferable positive electrode for a nickel-zinc secondary battery provided by the present invention.

DETAILED DESCRIPTION

For the purpose of further understanding the present invention, the preferred embodiments of the present invention will be described below in combination with the examples. However, it should be understood that these descriptions are made for explaining the features and advantages of the present invention, rather than limiting the claims of the present invention.

In the examples of the present invention, a positive electrode material for a nickel-zinc secondary battery is disclosed, including: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; in which the positive electrode active material is a spherical nickel hydroxide coated with $Co^{3+}$.

The positive electrode material provided by the present invention uses the spherical nickel hydroxide coated with $Co^{3+}$ as the positive electrode active material, and the mixture of yttrium oxide ($Y_2O_3$), Calcium hydroxide ($Ca(OH)_2$) and nickel powder as the positive electrode additive. The spherical nickel hydroxide coated with $Co^{3+}$ is formed by coating the surface of the spherical nickel hydroxide with $Co^{3+}$ compound, for example, coating $Ni(OH)_2 5.0$ with Zn3.35Co1.35, that is to say, it is a spherical nickel coated with cobalt formed by coating the surface of the spherical nickel hydroxide with 3.35 wt % zinc oxide and 1.35 wt % $Co^{3+}$. The spherical nickel hydroxide coated with $Co^{3+}$ is preferably product under Model No. Y6 provided by Jintian Energy Material Ltd., Corp.

Due to the good conductivity of $Co^{3+}$, coating the surface of spherical nickel hydroxide with $Co^{3+}$ can improve the utilization ratio of the positive electrode active material, and in turn greatly improve the charging/discharging efficiency of the nickel electrode; and at the same time inhibit the evolution of oxygen during charging. It is important that $Co^{3+}$ does not dissolve in alkaline electrolyte such as KOH solution and will not impose effect on Zn electrode. The spherical nickel hydroxide coated with $Co^{3+}$ preferably has a particle diameter of 280 mesh to 320 mesh, and more preferably 200 mesh.

A positive electrode additive is used to aid the positive electrode active material in improving the oxygen overpotential and discharging depth of the electrode. Since nickel powder has good conductivity, the adding of nickel can increase the conductivity of nickel hydroxide particle on one hand, and on the other hand facilitate the nickel electrode in improving the discharging depth, thereby significantly improving the discharging capacity of the battery. Additionally, the nickel powder acts as a catalyst in the battery. The experimental results shows that nickel powder can substantially enhance the compounding of hydrogen and oxygen at a temperature range of 25° C.-50° C., thereby greatly reducing the internal pressure of the battery and ensuring the safety of the battery during use. Therefore, the nickel powder plays a role of conducting electricity, increasing the discharging depth, and catalyzing the compounding of hydrogen and oxygen. The nickel powder has a particle diameter of preferably 50 mesh to 70 mesh, and more preferably 60 mesh.

In addition to the nickel powder, 0.2 wt %~0.6 wt % $Ca(OH)_2$ and 0.6 wt %~1 wt % $Y_2O_3$ are added in the positive electrode additive in combination with the nickel powder. The $Ca(OH)_2$ play the following roles: firstly, improving the overpotential for oxygen evolution of the nickel electrode, and enhancing the charging/discharging efficiency of the battery by inhibiting the swelling of the nickel electrode and the evolution of oxygen during charging, especially the charging efficiency of the battery at 30° C.~90° C., so that the battery has a broader operating range; and secondly, improving the diffusing speed of protons by changing the structure of the active material, and in turn increasing the utilization ratio of the active material as well as the discharging potential of the electrode, since the calcium on the surface of the positive electrode active particles will partially dissolve in the lattice of the active material during charging/discharging process of the nickel electrode. The calcium hydroxide preferably has a particle diameter of 70 mesh to 90 mesh. $Y_2O_3$ plays a similar role in the battery system as that of calcium, and further improves the oxygen overpotential and the discharging depth of the electrode. $Y_2O_3$ preferably has a particle diameter of 90 mesh to 120 mesh.

In the positive electrode material, the binder plays a role of carrying the above mentioned solid material and tightly binding them with base tape. In the present invention, the binder is preferably the mixture of polytetrafluoroethylene (PTFE) emulsion and Carboxymethyl cellulose (CMC) solution, or the mixture of polytetrafluoroethylene emulsion and Hydroxypropyl methyl cellulose (HPMC) solution. More preferably, the PTFE emulsion has a concentration of 50 wt %~70 wt %, and the CMC solution and the HPMC solution has a concentration of 0.6 wt %~1.0 wt %. The composite binder has a relatively high binding strength for nickel electrode, and thus can greatly inhibit the swelling and falling off of the positive electrode material.

It can be seen from the above technical solution that the positive electrode material provided by the present invention contains no $Co^{2+}$ ions and cadmium ions, thereby reducing the amount of hydrogen evolved from the electrode and improving the environmental friendliness of the battery; using the spherical nickel hydroxide coated with $Co^{3+}$ as the positive electrode active material improves the charging/discharging efficiency of the electrode; and in the combined use of nickel powder, yttrium oxide, and calcium hydroxide as the positive electrode additive, the nickel powder is used to improve the discharging depth of the nickel electrode, to catalyze the compounding of hydrogen and oxygen, and to reduce the amount of hydrogen evolved, and the yttrium oxide and calcium hydroxide are used to further improve the oxygen overpotential and discharging depth of the electrode. Therefore, the positive electrode prepared from the positive electrode material provide by the present invention can reduce the amount of hydrogen evolved in the battery while ensuring higher charging/discharging capacity of the electrode, and improve the service life and safety of the nickel-zinc battery.

The above positive electrode material for a nickel-zinc secondary battery can be prepared by the steps of:
a) uniformly mixing the above positive electrode active material, yttrium oxide, calcium hydroxide, and the nickel powder according to their weight ratio; and
b) uniformly agitating the mixture obtained in step a) with a binder to provide the above positive electrode material for nickel-zinc secondary battery.

The present invention further provides a positive electrode for nickel-zinc secondary battery, which includes a base tape and a positive electrode material coated on the surface of the base tape, in which the positive electrode material includes: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; the positive electrode active material is a spherical nickel hydroxide coated with $Co^{3+}$.

The positive electrode for a nickel-zinc secondary battery provided by the present invention adopts the above positive electrode material containing no $Co^{2+}$ ions and cadmium ions, thereby reducing the amount of hydrogen evolved from the electrode, and improving the environmental friendliness of the battery; using the spherical nickel hydroxide coated with $Co^{3+}$ as the positive electrode active material improves the charging/discharging efficiency of the electrode; and in the combined use of nickel powder, yttrium oxide, and calcium hydroxide as the positive electrode additive, the nickel powder is used to improve the discharging depth of the nickel electrode, to catalyze the compounding of hydrogen and oxygen, and to reduce the amount of hydrogen evolved, and the yttrium oxide and calcium hydroxide are used to further improve the oxygen overpotential and discharging depth of the electrode. Therefore, the positive electrode prepared from the positive electrode material provide by the present invention can reduce the amount of hydrogen evolved in the battery while ensuring higher charging/discharging capacity of the electrode, and improve the service life and safety of the nickel-zinc battery.

The base tape used in the above positive electrode for nickel-zinc secondary battery is a foamed nickel base tape known by those skilled in the art. The present invention adopts a continuous porous nickel base tape having an areal density of 300~520 $g/cm^2$, so as to ensure continuous and efficient production of electrode plate and consistent quality, as well as the flexibility of the electrode plate. The positive electrode material can be wet or dry coated onto the surface of the base tape.

FIG. 1 shows the schematically structural view of the preferred positive electrode for a nickel-zinc secondary battery provided by the present invention. The positive electrode includes:
a base tape and the above mentioned positive electrode material 2 coated on the surface of the base tape, the upper side of the base tape being not coated with the positive electrode material and forming a current collecting tape 11;
an air permeable membrane 3 wrapped on a coiling head end and a coiling tail end of the base tape;
a positioning adhesive layer 4 coated on the lower surface of the base tape and positioned on one side of the positive electrode material;
a conductive, shock-proof nickel metal sheet 5 welded on the surface of the base tape; the current collecting tape 11 in the positive electrode being an exposed nickel strip, which provides on the base tape an area having excellent performance and capable of decreasing the migration distance of electrons and reducing impedance, for dispersing and conducting current, thereby avoiding producing large amount of heat when current passes.

When being used, the positive electrode plate needs to be coiled, which starts from the starting end, that is, the coiling head end, and ends at the coiling tail end. In the manufacture or usage of the battery, the nickel fiber burrs exposed from the coiling head end and the tail end of the positive electrode plate are prone to pierce the membrane separator of the positive and negative electrodes and thus cause the failure of the battery. In the examples of the present invention, the head end and the tail end of the base tape are wrapped with an air permeable membrane, so as to prevent the nickel fiber burrs exposed from the coiling head end and the tail end of the positive electrode plate from piercing the membrane separator of the positive and negative electrodes during processing or using the battery, thus preventing the battery from failing and prolonging the service life thereof The air permeable membrane is preferably polypropylene grafted air permeable membrane, for example, the polypropylene grafted air permeable membranes sold under the trade name MPMD6015 by Mitsubishi Corp. (Japan).

The positioning adhesive layer 4 is formed by drying an adhesive, which is the mixture of polytetrafluoroethylene emulsion and Hydroxypropyl methyl cellulose solution. The adhesive has a high adhering strength with the base tape. Since the positive electrode material tends to swell or shrink during recycling and tends to fall off after deformation, and the positive electrode material fell into the electrolyte solution may cause safe risk to the battery, the positioning adhesive layer is arranged on the positive electrode material side of the base tape, so as to inhibit the deformation of the positive electrode material, and prevent the same from dropping into the electrolyte solution, thus improving the reliability of the battery. The weight ratio of polytetrafluoroethylene emulsion and hydroxypropyl methyl cellulose solution in the adhesive is preferably 1:4~6. The polytetrafluoroethylene emulsion has a concentration of 55 wt %~65 wt %, and the hydroxypropyl methyl cellulose solution has a concentration of 0.5~0.8 wt %. The positioning adhesive layer has a width of preferably 1.5 mm~2.5 mm The conductive, shock-proof nickel metal sheet 5 is used to improve the shock-proof property of the battery during use, enhance the applicability of the battery in harsh environment, and maintain the stable reliability of the battery when electronic devices are subjected to continuous and intense vibration. The conductive, shock-proof nickel metal sheet preferably has a width of 0.01 mm~0.03 mm Correspondingly, the present invention further provides a method for preparing the positive electrode for the nickel-zinc secondary battery, including:

a) coating a base tape with a positive material, the positive material including 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; in which the positive electrode active material is a spherical nickel hydroxide coated with $Co^{3+}$; and b) sequentially subjecting the base tape obtained in step a) to drying, rolling, and cutting to provide a positive electrode for the nickel-zinc secondary battery.

Step a) is a process for coating the positive electrode material on the surface of the positive electrode. The tape coated with the positive electrode in step a) needs to be dried at a temperature of preferably 70° C.~120° C. Then, the formed nickel metal sheet is rolled into a certain thickness so as to meet the demands for assembling and coiling. The rolled foamed nickel metal sheet is cleared of the positive electrode material attached on the beading sites on both sides by using a cleaning device, and then subjected to rolling again for cutting. Upon cutting, preferably, the four right-angle corners of the base tape are trimmed into arc corners of 135°~150°, so as to achieve obtuse angles and avoid damaging the membrane separator of the battery.

For the convenience of coiling the positive electrode plate, in the present invention, the positive electrode plate obtained by cutting is preferably softened through a kneading machine.

For the purpose of better understanding the present invention, the positive electrode material for the nickel-zinc secondary battery and the nickel-zinc secondary battery provided by the present invention are described in combination with the examples given below. However, the protection scope of the present invention is not limited by the following examples.

The foamed nickel base tapes used in the following examples are all purchased from Shandong Heze Corp., modeled 320~400 $g/m^2$;

The spherical nickel hydroxides coated with Co3+ are all purchased from Jintian Energy Material Ltd. Corp., modeled Y6;

The polypropylene grafted air permeable membranes are all purchased from Mitsubishi Corp. in Japan, modeled MPMD6015.

EXAMPLE 1

Preparing the positive electrode material having the following components:

Spherical nickel hydroxide coated with $Co^{3+}$:68.2 wt %
Nickel powder: 3.8 wt %
$Ca(OH)_2$:0.4 wt %
$Y_2O_3$:0.8 wt %
CMC glue having a concentration of 0.8 wt %:26 wt %
PTFE emulsion having a concentration of 60 wt %:0.8 wt %

The preparing method includes the steps of:

1. weighing the spherical nickel hydroxide coated with $Co^{3+}$ according to the above weight percentage, and screening through a 300 mesh sieve once; weighing $Ca(OH)_2$ according to the above weight percentage, and screening through a 80 mesh sieve once; and weighing nickel powder according to the above weight percentage, and screening through a 60 mesh sieve once.

2. loading the spherical nickel hydroxide coated with $Co^{3+}$, $Y_2O_3$, $Ca(OH)_2$ and nickel powder by increment into a 75L conical double-spindle powder mixer for mechanical coating and mixing purpose. The motor speed is set at 1.5 rad/s. When the coated material passes through the dual spindles powder mixer for processing, the dual spindle agitators are respectively rotated at 129 rad/s toward opposite directions, while being rotated counterclockwise as a whole at 7 rad/s for 45 minutes to homogenize the active material and addictives. The resultant is then stored and sealed in a plastic container for use.

3. weighing CMC glue having a concentration of 0.8 wt % according to the above weight ratio, and loading into the tank in a vacuum mixer. The positive electrode powder obtained in step 2 is added individually and mixed as follows:

3a. weighing 25 wt % positive electrode powder, and loading into the tank of the vacuum mixer. The rotating speed of the vacuum mixer is set at 70 rad/s, the rotating speed of the disperser in the mixer is set at 350 rad/s and the mixing time is set as 23 min Upon the mixing, the vacuum valve is opened, the vacuum is set at −0.15 aPM, and the time for vacuum-pumping is set as 10 min 3b. weighing 40 wt % positive electrode powder, and loading into the tank of the vacuum mixer. The rotating speed of the vacuum mixer is set at 50 rad/s, the rotating speed of the disperser in the mixer is set at 170 rad/s and the mixing time is set as 15 min Upon the mixing, the vacuum pump is started, the vacuum is set at −0.1 aPM, and the time for vacuum-pumping is set as 10 min 3c. weighing 40 wt % positive electrode powder, weighing 60 wt % PTFE emulsion according to the weight ratio, and loading them into the tank of the vacuum mixer. The rotating speed of the vacuum mixer is set at 47 rad/s, the rotating speed of the disperser in the mixer is set at 400 rad/s and the mixing time is set as 45 min Upon the mixing, the vacuum valve is opened, the vacuum is set at −0.1 aPM, and the time for vacuum-pumping is set as 10 min, so as to prepare the positive electrode material.

EXAMPLE 2-EXAMPLE 4

The positive electrode material in the three examples is prepared in the same procedure as in example 1, and the components of the positive electrode material are list in table 1 below.

TABLE 1

| Components of the positive electrode material |
| --- |
| Example 2 | spherical nickel hydroxide coated with $Co^{3+}$: 68.5 wt % <br> Nickel powder: 3.6 wt % <br> $Ca(OH)_2$: 0.4 wt % <br> $Y_2O_3$: 0.7 wt % <br> CMC glue having a concentration of 0.8 wt %: 26 wt % <br> PTFE emulsion having a concentration of 60 wt %: 0.8 wt % |
| Example 3 | spherical nickel hydroxide coated with $Co^{3+}$: 68.8 wt % <br> Nickel powder: 3.8 wt % <br> $Ca(OH)_2$: 0.3 wt % <br> $Y_2O_3$: 0.9 wt % <br> CMC glue having a concentration of 0.8 wt %: 26 wt % <br> PTFE emulsion having a concentration of 60 wt %: 0.5 wt % |
| Example 4 | spherical nickel hydroxide coated with $Co^{3+}$: 68.4 wt % <br> Nickel powder: 3.6 wt % <br> $Ca(OH)_2$: 0.5 wt % <br> $Y_2O_3$: 0.7 wt % <br> CMC glue having a concentration of 0.8 wt %: 26 wt % <br> PTFE emulsion having a concentration of 60 wt %: 0.8 wt % |

EXAMPLE 5

1. The foamed nickel base tape is pre-pressed, and passed through a constant-temperature material tank capable of agitating, in which tank the positive electrode material prepared according to example 1 is contained. The slurry of the positive electrode material is uniformly coated on the foamed nickel base tape under constant temperature and continuous agitation. The excessive slurry of the positive electrode material attached on the foamed nickel base tape is removed by a scraper blade.

2. The coated foamed nickel base tape sequentially passes drying chambers of 78° C., 100° C., and 117° C., so that the dried base tape contains 7%~9% $H_2O$, ensuring good flexibility of the positive electrode plate, and preventing the positive electrode plate from breaking during coiling.

3. The foamed porous nickel positive electrode obtained in step 2 is passed through a vertical rolling device for rolling, which has a diameter of 400-500 mm and a length of 500-600 mm, and is provided with liquid-air pressure adjusting controlling. The rolled continuous strip-like foamed nickel base tape is passed through an automatic ultrasonic cleaning device, so as to clear of the positive electrode material attached on the beading sites on both sides.

4. The rolled continuous positive electrode foamed nickel base tape is passed through an automatic slicer to longitudinally slice the continuous positive electrode foamed nickel base tape to a length required for the process, the semi-finished product is passed through an automatic slice separator and horizontally cut along the width of the plate, and the four corner of the cut positive electrode plate are trimmed into arc corners of 135° -150°.

5. The positive electrode plate obtained in step 4 is dipped in an adhesive, which is the mixture of 0.6 wt % HPMC binder and 60 wt % PTEE emulsion in a weight ratio of 100:20, until a 2 mm width of the plate is obtained. Then the dipped plate is baked at 60° C. for 5 min 6. The plate obtained in step 5 is softened in a continuous kneading machine.

7. The plate obtained in step 6 is passed through a horizontal rolling device having a diameter of 200-300 mm and a length of 500 mm The gap between the rollers is adjusted to be 0.01 mm thinner than the thickness of the plate and the plate is rolled one after another by the rolling device, so as to flatten the protruded nickel metal fiber at the periphery of the plate.

8. The coiling head end and the tail end of the positive electrode plate are coated with 0.8 wt % HPMC glue, with the coating width being no more than 3 mm Then small pieces of polypropylene grafted air permeable membrane are wrapped on the coiling head end and the tail end of the positive electrode plate, and the resultant is dried at 60° C. for 5 min 9. At the edge of the uncoated side of the plate, an area for accommodating the shock-proof metal sheet is cleaned by an ultrasonic cleaner, on which a pure nickel metal sheet having a thickness of 0.02 mm is weld by a reserve energy welding machine. The surface of the welding site is covered by an alkali resistant, high-temperature resistant and insulate PP membrane, so as to prevent needle-like hard object from piercing the membrane separator and failing the battery. A positive electrode for a nickel-zinc secondary battery is thus obtained.

10. The obtained plates are individually weighed on a one by one basis on an electronic balance having a division value of 0.005 g and a weighing range of 500 g, and are classified by a division value of 0.1 g. The classified plates are individually loaded into plastic pouches of 0.3 mm thick, vacuum-packaged on a vacuum package machine, and stored at room temperature and a humidity≤60%, away from light.

EXAMPLES 6-8

The three examples prepare the positive electrode for a nickel-zinc secondary battery by the same procedure as in example 5, except that, in step 1, the positive electrode material prepared according to examples 2-4 are respectively contained in the material tank, that is, examples 6-8 respectively use the foamed nickel base tape coated with the positive electrode material prepared according to examples 2-4.

The positive electrode for nickel-zinc secondary battery, the membrane separator layer, and the zinc negative electrode prepared in each of examples 5-9 are sequentially wound in an overlaid way into electrode assembly by a winder, which is then placed in a sc-type steel battery case with one open end. The battery cases are filled with electrolyte solution, and sealed to provide sc-type cylindrical nickel-zinc secondary batteries, sequentially numbered BT-1a, BT-1b, BT-1c, and BT-1d. These batteries are tested for the internal resistance, the discharging capacity, and the gas swelling. The results are shown in the table 2 below.

TABLE 2 results for the internal resistance, the discharging
capacity, and the gas swelling of the batteries

| No. | Height of the batteries (mm) | Charging internal resistance (mΩ) | Discharging capacity (mAh) | Discharging internal resistance (mΩ) | Height after formation (mm) | Height difference (mm) |
|---|---|---|---|---|---|---|
| BT-1a | 42.26 | 4.6 | 2107 | 6.2 | 42.27 | 0.01 |
| BT-1b | 42.23 | 4.3 | 2017 | 6.5 | 42.24 | 0.01 |
| BT-1c | 42.24 | 4.4 | 2013 | 6.5 | 42.25 | 0.01 |
| BT-1d | 42.25 | 4.3 | 2010 | 6.2 | 42.26 | 0.01 |

The positive electrode for nickel-zinc secondary battery, the membrane separator layer, and the zinc negative electrode prepared in example 5 are sequentially wound in an overlaid way into an electrode assembly by a winder, which is then placed in a M-type-19AH steel battery case with one open end. The battery case is filled with electrolyte solution, and sealed to provide M-type-19AH cylindrical nickel-zinc secondary battery. The battery is tested for the cycling characteristics under 1C. The results are shown in the table 2 below.

TABLE 2 results for the cycling performance of the battery under 1C

| Initial capacity (mAh) | Times for cycling | Remaining capacity (mAh) | Percentage of remaining capacity (%) |
|---|---|---|---|
| 19043 | 50 | 18953 | 99.53 |
| | 100 | 18820 | 98.9 |
| | 150 | 19620 | 97.8 |
| | 200 | 18368 | 96.5 |
| | 250 | 18167 | 95.405 |
| | 300 | 17964 | 94.33 |
| | 350 | 17773 | 93.0 |
| | 400 | 17569 | 92.3 |
| | 450 | 17368 | 91 |
| | 500 | 17196 | 90 |

It can be seen from the above results that the positive electrode prepared from the positive electrode material provided by the present invention has low amount of evolved hydrogen, high discharging capacity, and excellent cycling performance.

The above examples are illustrated only for aiding in understanding the method and the principal concept of the present invention. It should be noted that, a variety of improvements and modifications can be made by those skilled in the art without departing from the principle of the present invention, which also fall into the protection scope of the claims of the present invention.

The above description to the examples as disclosed is made so that those skilled in the art can carry out or utilize the present invention. It is obvious that various modifications to these examples can be made by those skilled in the art. The general principle defined herein can be carried out in other examples, without departing from the spirit or scope of the present invention. Therefore, the present invention will not be limited to those examples illustrated in the description, and on the contrary, will be defined by the broadest scope complying with the principle and the novel features of the present invention.

What is claimed is:

1. A positive electrode material for a nickel-zinc secondary battery, characterized in the positive electrode material consisting of:
68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance, the binder is a mixture of polytetrafluoroethylene emulsion and carboxymethyl cellulose solution, or a mixture of polytetrafluoroethylene emulsion and hydroxypropyl methyl cellulose solution; the positive electrode active material being a spherical nickel hydroxide coated with $Co^{3+}$, wherein the spherical nickel hydroxide coated with $Co^{3+}$ includes 3.35 wt % zinc oxide and 1.35 wt % $Co^{3+}$.

2. The positive electrode material according to claim 1, characterized in that the yttrium oxide has a particle diameter of 90 to 120 mesh, the calcium hydroxide has a particle diameter of 70 to 90 mesh, and the nickel powder has a particle diameter of 50 to 70 mesh.

3. A positive electrode for a nickel-zinc secondary battery, the positive electrode comprising a base tape and a positive electrode material coated on the surface of the base tape, characterized in the positive electrode material consisting of:
68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance, the binder is a mixture of polytetrafluoroethylene emulsion and carboxymethyl cellulose solution, or a mixture of polytetrafluoroethylene emulsion and hydroxypropyl methyl cellulose solution; the positive electrode active material being a spherical nickel hydroxide coated with $Co^{3+}$, wherein the spherical nickel hydroxide coated with $Co^{3+}$ includes 3.35 wt % zinc oxide and 1.35 wt % $Co^{3+}$.

4. The positive electrode for the nickel-zinc secondary battery according to claim 3, characterized in that a coiling head end and a coiling tail end of the base tape are coated with an air permeable membrane.

5. The positive electrode for the nickel-zinc secondary battery according to claim 3, characterized in further comprising: a positioning adhesive layer coated on a lower surface of the base tape and positioned on one side of the positive electrode material, wherein the positioning adhesive layer includes an adhesive, and the adhesive is a mixture of polytetrafluoroethylene emulsion and hydroxypropyl methyl cellulose.

6. The positive electrode for the nickel-zinc secondary battery according to claim 3, characterized in that the positioning adhesive layer has a width of 1.5 mm~2.5 mm.

7. The positive electrode for the nickel-zinc secondary battery according to claim 3, characterized in further comprising: a conductive, shockproof nickel metal sheet welded on the surface of the base tape.

8. The positive electrode for the nickel-zinc secondary battery according to claim 3, characterized in that the base tape is a continuous porous nickel base tape having an areal density of 300~520 g/cm$^2$.

9. A method for preparing the positive electrode for the nickel-zinc secondary battery according to claim 4, comprising:
- (a) forming positive electrode active material being a spherical nickel hydroxide coated with $Co^{3+}$ by coating the surface of the spherical nickel hydroxide with 3.35 wt % zinc oxide and 1.35 wt % $Co^{3+}$;
- (b) coating the surface of the base tape with the positive electrode material consisting of 68 wt %~69 wt % the positive electrode active material, 0.6 wt %~1 wt % yttrium oxide, 0.2 wt %~0.6 wt % calcium hydroxide, 3.5 wt %~4 wt % nickel powder, and a binder in balance, the binder is a mixture of polytetrafluoroethylene emulsion and carboxymethyl cellulose solution, or a mixture of polytetrafluoroethylene emulsion and hydroxypropyl methyl cellulose solution; and
- (c) sequentially subjecting the base tape obtained in step (b) to drying, rolling, and cutting to provide the positive electrode for the nickel-zinc secondary battery.

\* \* \* \* \*